(12) United States Patent
Sale et al.

(10) Patent No.: US 11,081,719 B2
(45) Date of Patent: Aug. 3, 2021

(54) PRODUCTION OF ELECTRICAL ENERGY STORAGE DEVICES

(71) Applicant: MANZ ITALY S.R.L., Sasso Marconi (IT)

(72) Inventors: Massimiliano Sale, Sasso Marconi (IT); Fabrizio Nanni, Sasso Marconi (IT)

(73) Assignee: Manz Italy S.r.l.

( * ) Notice: Subject to any disclaimer, the term of this patent is extended or adjusted under 35 U.S.C. 154(b) by 205 days.

(21) Appl. No.: 16/349,878

(22) PCT Filed: Nov. 20, 2017

(86) PCT No.: PCT/IB2017/057244
§ 371 (c)(1),
(2) Date: May 14, 2019

(87) PCT Pub. No.: WO2018/096435
PCT Pub. Date: May 31, 2018

(65) Prior Publication Data
US 2019/0273279 A1    Sep. 5, 2019

(30) Foreign Application Priority Data
Nov. 24, 2016    (IT) ........................ 102016000119013

(51) Int. Cl.
*H01M 10/04*    (2006.01)
*H01M 50/40*    (2021.01)

(52) U.S. Cl.
CPC ... *H01M 10/0404* (2013.01); *H01M 10/0459* (2013.01); *H01M 50/40* (2021.01)

(58) Field of Classification Search
CPC .................................................. H01M 10/0404
See application file for complete search history.

(56) References Cited

U.S. PATENT DOCUMENTS

| | | |
|---|---|---|
| 2002/0007552 A1 | 1/2002 | Singleton et al. |
| 2008/0280208 A1 | 11/2008 | Naoi et al. |
| 2013/0305524 A1 | 11/2013 | Hohenthanner et al. |
| 2014/0059855 A1 | 3/2014 | Miyazaki et al. |
| 2014/0134472 A1 | 5/2014 | Kim |
| 2016/0006072 A1 | 1/2016 | Cho et al. |

FOREIGN PATENT DOCUMENTS

| | | |
|---|---|---|
| WO | 02095858 A1 | 11/2002 |
| WO | 2013175296 A1 | 11/2013 |

*Primary Examiner* — Carlos Barcena
(74) *Attorney, Agent, or Firm* — Laubscher & Laubscher, P.C.

(57) ABSTRACT

A method and an apparatus are disclosed for the production of electrical energy storage devices, in which two separators are fed alongside one another, two anode feeders arrange in an alternating manner a succession of anodes one after the other between the two separators, two cathode feeders arrange a succession of cathodes one after the other on the outer sides of the two separators in an alternating manner so that only one cathode is superimposed on each anode, after which a cutting device separates various discrete elements, each consisting of only one anode and only one cathode with the interposition of portions of the two separators.

19 Claims, 3 Drawing Sheets

PRODUCTION OF ELECTRICAL ENERGY STORAGE DEVICES

CROSS-REFERENCE TO RELATED APPLICATIONS

This application is a § 371 National Stage Entry of International Patent Application No. PCT/IB2017/057244 filed Nov. 20, 2017. Application No. PCT/IB2017/057244 claims priority of IT102016000119013 filed Nov. 24, 2016. The entire content of these applications are incorporated herein by reference.

BACKGROUND OF THE INVENTION

The invention relates to a method and an apparatus for the production of electrical energy storage devices.

Specifically, but not exclusively, the invention can be applied to producing batteries, for example lithium ion batteries or polymer lithium ion batteries.

In particular, reference is made to the production of electrical energy storage devices by forming a plurality of single cells, each of which consists of two (cathode or anode) electrodes alternated with two separating portions. The single cells are then connected together (in series).

The prior art comprises many examples of methods for the production of electrical energy storage devices.

Patent publication US 2008/0280208 A1 discloses a method for producing an electrochemical device that comprises a single continuous separating element that is folded several times on itself to separate anodes and cathodes.

Patent publication WO 02/095858 discloses a separating tape folded into a "Z" by a laminating unit.

Patent publication US 2002/0007552 A1 discloses a method for the production of battery cells from at least one tape of material for anodes, one tape of material for cathodes and two separating tapes.

Patent publication US 2014/0134472 A1 discloses a cell for a secondary battery comprising a stack formed in sequence by a first electrode/separator/second electrode/separator/first electrode and by an outer separator stacked on each first electrode.

Patent publication US 2016/006072 A1 discloses a method for producing a secondary battery comprising feeding two separating tapes with four sets of electrodes to a stacking area.

Various aspects of the prior art of the production of electrical energy storage devices are improvable. Firstly, it is desirable to increase productivity. It is further desirable to improve manufacturing precision to obtain high quality electrical energy storage devices.

SUMMARY OF THE INVENTION

One object of the invention is to provide a method and/or an apparatus for the production of electrical energy storage devices that is able to remedy one or more of the aforesaid limits and drawbacks of the prior art.

One advantage is to enable electrical energy storage devices to be produced with high productivity.

One advantage is to enable electrical energy storage devices of high quality to be produced.

One advantage is the production of electrical energy storage devices formed of a plurality of single cells, in which the end electrodes are always anodes without the need to overturn the cells in the productive process.

One advantage is to provide a constructionally cheap and simple apparatus for producing electrical energy storage devices.

These objects and advantages and still others are achieved by an apparatus and/or by a method according to one or more of the claims set out below.

In one embodiment, a method for the production of electrical energy storage devices comprises the steps of feeding two separators that are next to one another, arranging a succession of anodes one after the other between the two separators, arranging a succession of cathodes one after the other on the two outer sides of the two separators in an alternate manner by superimposing a cathode on each anode. The method may comprise the step of separating various single elements, each of which comprises a (single) anode and a (single) cathode with the interposition of portions of the two separators.

In one embodiment, an apparatus for the production of electrical energy storage devices comprises two feeders of two separators that are next to one another, two anode feeders configured for arranging alternately a succession of anodes one after the other between the two separators, two cathode feeders configured for arranging a succession of cathodes one after the other on the two outer sides of the two separators alternately by superimposing a cathode on each anode. The apparatus may comprise a device for separating various single elements, each comprising a (single) anode and a (single) cathode with the interposition of portions of the two separators.

BRIEF DESCRIPTION OF THE DRAWINGS

The invention can be better understood and implemented with reference to the attached drawings that illustrate one embodiment thereof by way of non-limiting example, in which.

DETAILED DESCRIPTION

Figure 1:
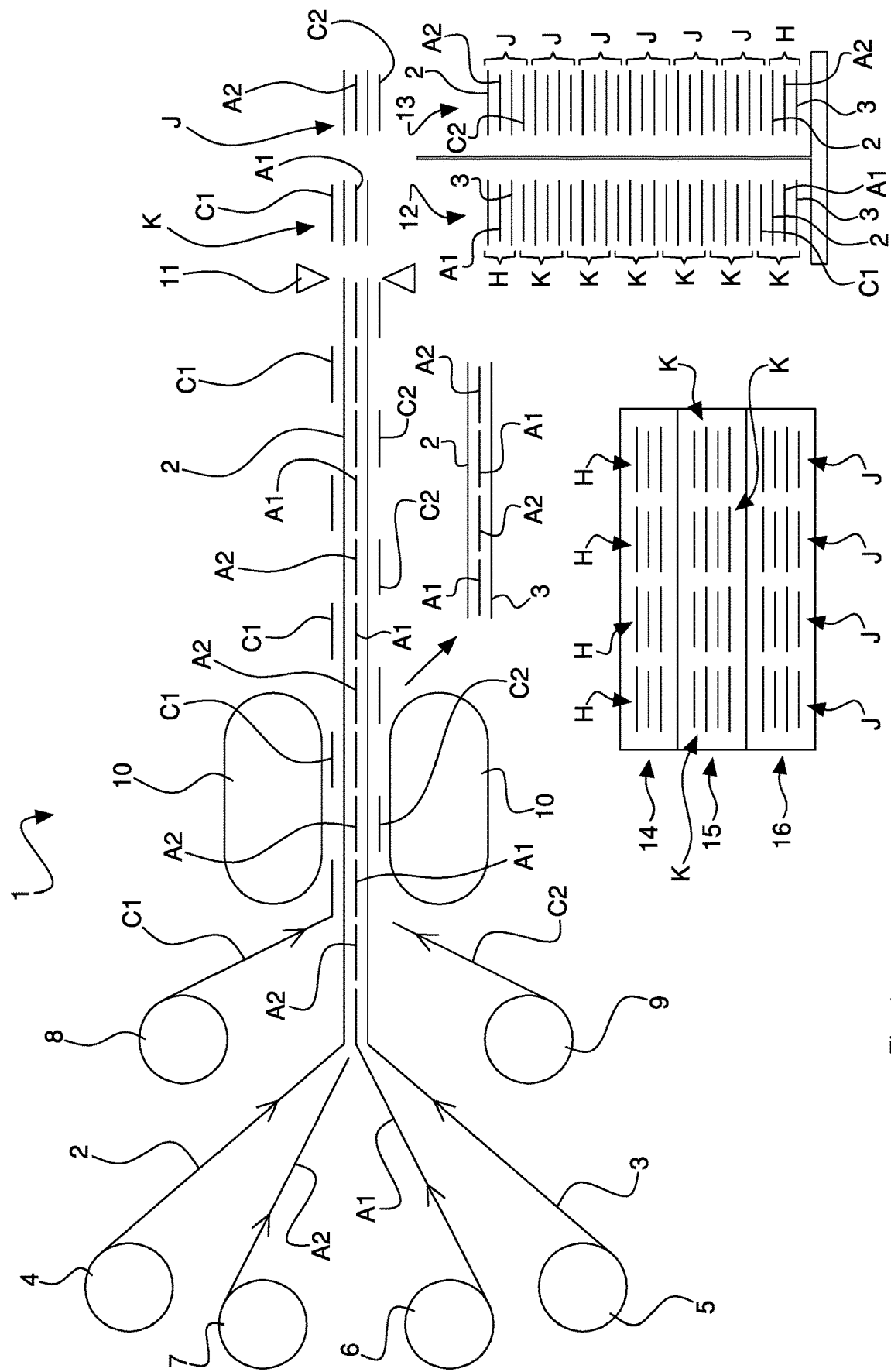
FIG. 1 is a diagram, according to a raised vertical view, of one embodiment of an apparatus for the production of electrical energy storage devices made according to the present invention.
Figure 3:
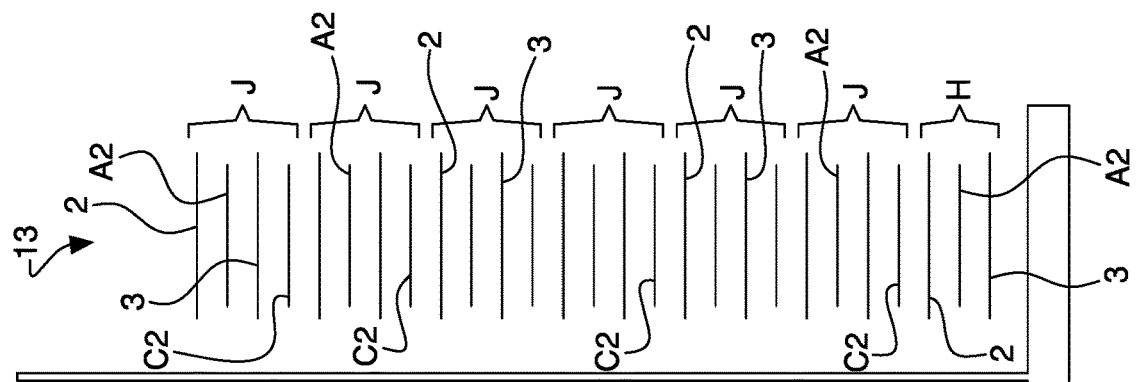
FIGS. 2 and 3 show two enlarged details of FIG. 1.
Figure 3:
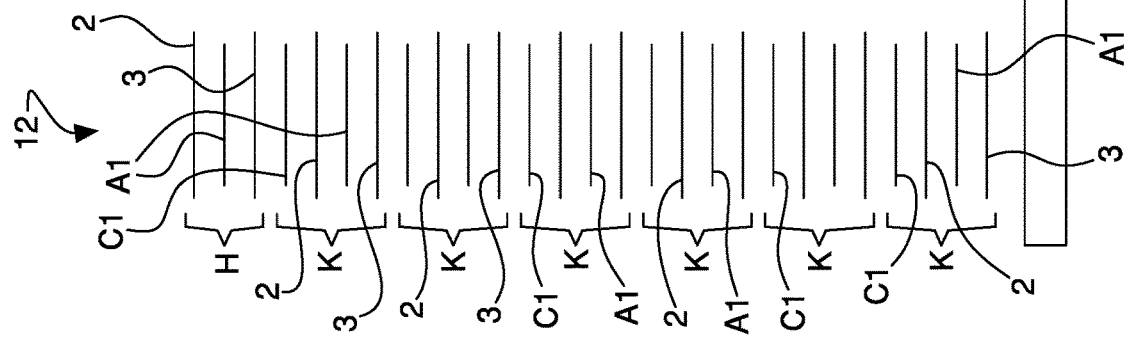
Figure 2:
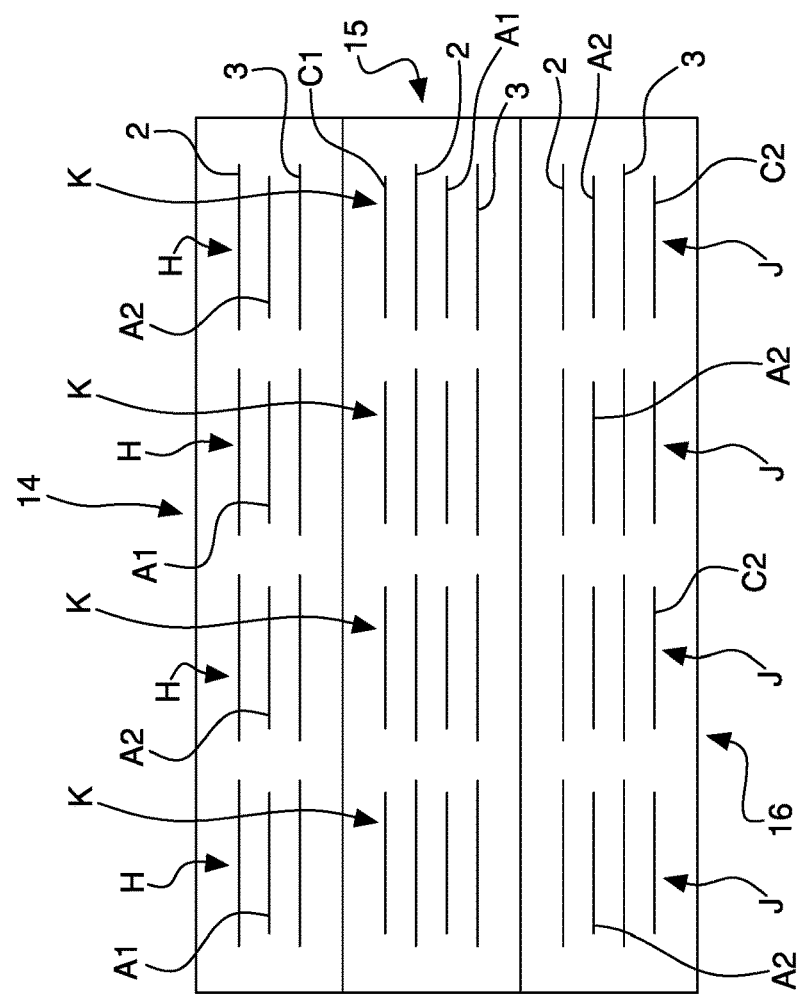
Figure 4:
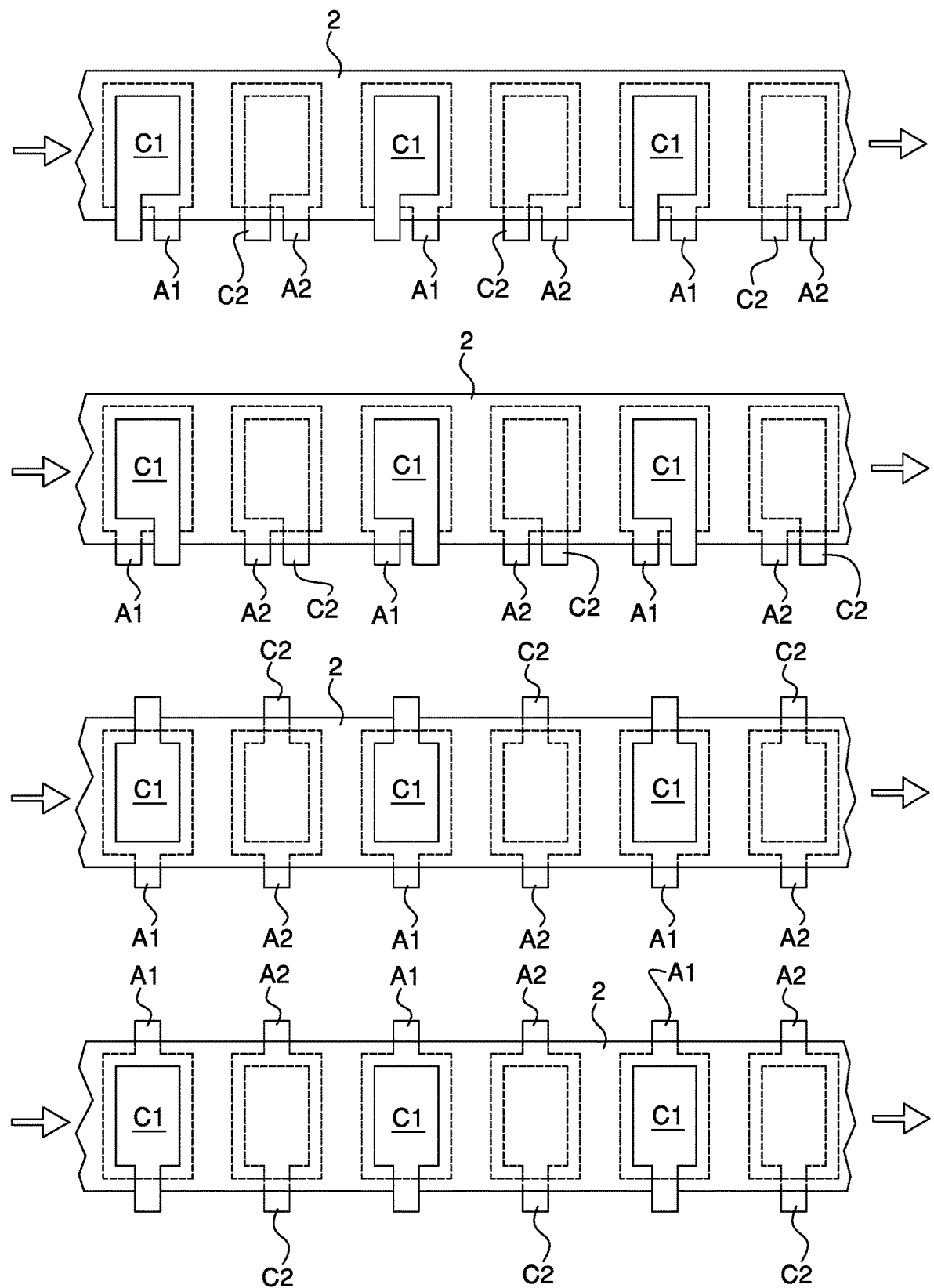
FIG. 4 shows, according to top plan views, certain embodiments of configurations that electrodes may adopt during the advancement of the apparatus of FIG. 1.

With 1, overall an apparatus has been indicated for the production of electrical energy storage devices.

The production apparatus 1 may comprise, in particular, an arrangement for feeding a first separator 2 and a second separator 3 that are next to one another along a (preset) advancement path. The first separator 2 may comprise a separator material in the form of a continuous tape. The second separator 3 may comprise a separator material in the form of a continuous tape.

The arrangement for feeding the first and the second separators 2 and 3 may comprise, in particular, at least one first feeder 4 arranged for feeding the first tape-shaped separator 2. The arrangement for feeding the first and the second separators may comprise, in particular, at least one second feeder 5 arranged for feeding the second tape-shaped separator 3. The first feeder 4 may comprise, for example, a (known) device for unwinding at least one tape from at least one reel. The second feeder 5 may comprise, for example, a (known) device for unwinding at least one tape from at least one reel. The first feeder 4 may operate, in particular, with continuous and/or intermittent advancement. The second feeder 5 may operate, in particular, with continuous and/or intermittent advancement.

The production apparatus 1 may comprise, in particular, an arrangement for arranging a succession of first electrodes A1, A2 one after another on the aforesaid advancement path between the first separator 2 and the second separator 3.

The aforesaid arrangement for arranging a succession of first electrodes A1, A2 may comprise, in particular, at least one third feeder 6 arranged for feeding a succession of first electrodes A1 in an inlet zone between the two separators 2 and 3 and at least one fourth feeder 7 arranged for feeding a succession of first electrodes A2 in the aforesaid inlet zone. The third feeder 6 and the fourth feeder 7 may be configured, in particular, in such a manner as to feed the first electrodes A1, A2 alternately one before the other, in succession.

The third feeder 6 may comprise, for example, a (known) device for unwinding at least one tape from at least one reel. The fourth feeder 7 may comprise, for example, a (known) device for unwinding at least one tape from at least one reel. The third feeder 6 may operate, in particular, with continuous and/or intermittent advancement. The fourth feeder 7 may operate, in particular, with continuous and/or intermittent advancement. The third feeder 6 may comprise, for example, a (known) device for separating electrodes A1 from a tape and for applying electrodes A1 to a separator. The fourth feeder 7 may comprise, for example, a (known) device for separating electrodes A2 from a tape and for applying electrodes A2 to a separator.

The production apparatus 1 may comprise, in particular, an arrangement for arranging a succession of second electrodes C1 one after another on the aforesaid advancement path on a side of the first separator 2 opposite the second separator 3.

The aforesaid arrangement for arranging a succession of second electrodes C1 may comprise, in particular, at least one fifth feeder 8 arranged for feeding second electrodes C1 on a side of the first separator 2. The fifth feeder 8 may comprise, for example, a (known) device for unwinding at least one tape from at least one reel. The fifth feeder 8 may operate, in particular, with continuous and/or intermittent advancement. The fifth feeder 8 may comprise, for example, a (known) device for separating electrodes C1 from a tape and for applying electrodes C1 to a separator.

The production apparatus 1 may comprise, in particular, an arrangement for arranging a succession of third electrodes C2 one after another on the aforesaid advancement path on a side of the second separator 3 opposite the first separator 2.

The aforesaid arrangement for arranging a succession of third electrodes C2 may comprise, in particular, at least one sixth feeder 9 arranged for feeding third electrodes C2 on a side of the second separator 3. The sixth feeder 9 may comprise, for example, a (known) device for unwinding at least one tape from at least one reel. The sixth feeder 9 may operate, in particular, with continuous and/or intermittent advancement. The sixth feeder 9 may comprise, for example, a (known) device for separating electrodes C2 from a tape and for applying electrodes C2 to a separator.

The production apparatus 1 may comprise, in particular, a control arrangement configured for controlling the aforesaid feeding arrangement for feeding the separators and the electrodes such that the second electrodes C1 are superimposed on respective first electrodes A1 with the interposition of the first separator 2.

The control arrangement may comprise a programmable electronic control device, for example an electronic processor, provided with computer programme instructions that are implementable on the control arrangement.

The control arrangement may be configured, in particular, for controlling the aforesaid feeding arrangement for feeding the separators and the electrodes in such a manner that on some portions of the first separator 2 second electrodes C1 are not arranged (in a regular manner). The aforesaid portions of the first separator 2, on which the second electrodes C1 are not arranged, may be superimposed on one or more first electrodes A2.

The control arrangement may be configured, in particular, for controlling the aforesaid feeding arrangement for feeding the separators and the electrodes such that the third electrodes C2 are superimposed on respective first electrodes A2 with the interposition of the second separator 3. The control arrangement may be configured, in particular, for controlling the aforesaid feeding arrangement for feeding the separators and the electrodes in such a manner that on some portions of the second separator 3 third electrodes C2 are not arranged. The aforesaid portions of the second separator 3, on which third electrodes C2 are not arranged, may be superimposed on one or more first electrodes A1.

The control arrangement may be configured, in particular, for controlling the aforesaid feeding arrangement for feeding the separators and the electrodes such that the second electrodes C1 are superimposed on first electrodes A1 that may be in turn superimposed on portions of second separator 3 on which third electrodes C2 are not arranged. The control arrangement may be configured, in particular, for controlling the aforesaid feeding arrangement for feeding the separators and the electrodes such that the third electrodes C2 are superimposed on first electrodes A2 that may be in turn superimposed on portions of first separator 2 on which second electrodes C1 are not arranged.

The production apparatus 1 may comprise, in particular, at least one laminating device 10 (for example of the roller type) arranged along the aforesaid advancement path for coupling, by lamination, the separators 2 and 3 with at least the first electrodes A1, A2 and/or the second electrodes C1 and/or the third electrodes C2. The laminating device 10 may be arranged, in particular, downstream of the zones in which the various feeders 6-9 introduce the electrodes A1, A2, C1, C2 onto the separators 2 and 3.

The production apparatus 1 may comprise, in particular, at least one cutting device 11 arranged for separating (for example by laser cutting, twin-bladed mechanical cutting, or other types of cutting) discrete elements from a continuous product. The cutting device 11 may be arranged, in particular, downstream of the zones in which the various feeders 6-9 introduce the electrodes A1, A2, C1, and C2 onto the separators 2 and 3 and/or downstream of the laminating device 10.

The control arrangement may be configured in such a manner as to actuate a method for the production of electrical energy storage devices. This method of production may comprise, in particular, the step of feeding the first separator 2 and the second separator 3 that are next to one another along the advancement path.

This method of production may comprise, in particular, the step of arranging a succession of first electrodes A1, A2 one after another in the advancement path between the first separator 2 and the second separator 3. The first electrodes A1, A2 may be arranged so as to alternate a first electrode A1 coming from the third feeder 6 with a first electrode A2 coming from the fourth feeder 7.

This method of production may comprise, in particular, the step of arranging a succession of second electrodes C1 one after another in the advancement path on the (outer) side of the first separator 2 opposite the second separator 3. Each second electrode C1 may be superimposed on a respective first electrode A1 with the interposition of the first separator 2. On some portions of first separator 2 (at regular intervals) it may be provided not to arrange second electrodes C1. Such portions of first separator 2 may be superimposed on at least one first electrode A1.

This method of production may comprise, in particular, the step of arranging a succession of third electrodes C2 one after another in the advancement path on the (outer) side of the second separator 3 opposite the first separator 2. Each third electrode C2 may be superimposed on a respective first electrode A2 with the interposition of the second separator 3. On some portions of second separator 3 (at regular intervals) it may be provided not to arrange third electrodes C2. Such portions of second separator 3 may be superimposed on at least one first electrode A2.

The second electrodes C1 and the third electrodes C2 may be arranged so as to alternate a second electrode C1 (on the outer side of the first separator 2) coming from the fifth feeder 8 with one third electrode C2 (on the outer side of the second separator 3) coming from the sixth feeder 9. The second electrodes C1 and the third electrodes C2 may be arranged so as to superimpose a second electrode C1 (coming from the fifth feeder 8) on a first electrode A1 (coming from the third feeder 6) and a third electrode C2 (coming from the sixth feeder 9) on a first electrode A2 (coming from the fourth feeder 7).

The first electrodes A1 and A2 may comprise, in particular, anodes. The second electrodes C1 may comprise, in particular, cathodes. The third electrodes C2 may comprise, in particular, cathodes.

The method of production may provide, in particular, for each second electrode C1 being superimposed on a respective first electrode A1 (by the third feeder 6) which in turn may be superimposed on a portion of second separator 3 on which no third electrode C2 is arranged. The method of production may provide, in particular, for each third electrode C2 being superimposed on a respective first electrode A2 (by the fourth feeder 7) which in turn is superimposed on a portion of first separator 2 on which no second electrode C1 is arranged.

The first separator 2 may comprise a continuous (tape) element. The second separator 3 may comprise a continuous (tape) element. The method of production may comprise, in particular, the step of separating discrete elements K, J from a product that comprises the first, the second and the third electrodes A1, A2, C1, and C2 arranged on the first and on the second separators 2 and 3. Separation may be performed by a cutting device (for example by the cutting device 11).

Each discrete element K, J that is separated may comprise, as in this embodiment, just one first electrode A1 or A2 and only one other electrode that may consist of a second electrode C1 or a third electrode C2.

The method may comprise, in particular, the step of forming at least one first group 12 that comprises a plurality of discrete elements K that are coupled with one another (for example serially connected), in which the other electrode of the discrete elements K of the first group 12 is a second electrode C1. The first group 12 may comprise, for example, a (vertical) stack of discrete elements K superimposed on one another.

The method may comprise, in particular, the step of forming at least one second group 13 that comprises a plurality of discrete elements J that are coupled with one another (for example serially connected), in which the other electrode of the discrete elements J of the second group 13 is a third electrode C2. The second group 13 may comprise, for example, a (vertical) stack of discrete elements J superimposed on one another.

The method may comprise, in particular, the step of separating discrete auxiliary elements H from a product comprising the first electrodes A1, A2 arranged between the first separator 2 and the second separator 3, without the second and the third electrodes C1 and C2. Each discrete auxiliary element H may comprise, as in this case, just one first electrode A1 or A2 comprised between the separators 2 and 3, without any other electrode.

One discrete auxiliary element H may be located at the top of the first group 12 (vertical stack) and at the base of the second group 13 (vertical stack) in such a manner that the end electrodes located at the base and at the top of the first group 12 consist of first electrodes A1 and that the end electrodes located at the base and at the top of the second group 13 consist of first electrodes A2. In this manner it is possible to ensure that the end electrodes are always of the same type (anodes), without the need to overturn a discrete element K or J.

The method of production may comprise, in particular, the step of forming at least one first magazine 14 of discrete auxiliary elements H. The step of forming the first magazine 14 may comprise the step of feeding the separators 2 and 3 and the first electrodes A1 and A2 along the aforesaid advancement path, without feeding, for a certain period of time, the second and third electrodes C1 and C2. The step of forming the first magazine 14 may comprise the step of coupling (by the laminating device 10) the separators 2 and 3 with the first electrodes A1 and A2, the step of separating discrete auxiliary elements H (by the cutting device 11) and the step of conveying the discrete auxiliary elements H to the first magazine 14. The discrete auxiliary elements H may be withdrawn from the first magazine 14 according to need.

The method of production may comprise, in particular, the step of forming at least one second magazine 15 of discrete elements K in which the other electrode of these discrete elements K consists of a second electrode C1. The method of production may comprise, in particular, the step of forming at least one third magazine 16 of discrete elements J in which the other electrode of these discrete elements J consists of one third electrode C2. The discrete elements K and J may be withdrawn from the second magazine 15 or from the third magazine 16 according to need, in particular to replace possible defects of discrete elements K or J during the normal processing process, for example because of rejects due to defects of an element or because of other process irregularities.

The method of production may comprise, in particular, the step of coupling, by lamination (for example by the laminating device 10), the first, the second and the third electrodes A1, A2, C1, C2 with the first and the second separator 2 and 3.

The groups 12 and 13 of discrete elements (stacks of monocells) may undergo further processes (of known type) in order to obtain the final product, i.e. electrical energy storage devices, in particular lithium ion batteries.

The various feeders 4-9 may comprise, in particular, devices for feeding separators and/or electrodes of the type already in use in known apparatuses for the production of electrical energy storage devices.

The production apparatus 1 may further comprise one or more manipulators (not shown, for example of known type) configured in such a manner as to transfer the discrete elements K and J and the discrete auxiliary elements H from the outlet of the cutting device 11 to the desired places, in particular to the grouping zones, i.e. where the groups 12 and 13 are formed, or to the magazines 14, 15 and 16, or from the magazines 14, 15 and 16 to the formation zones of the groups 12 and 13.

The discrete auxiliary element H could be positioned at the end of the group 12 (at the top of the stack) in a place that is different from the forming pace of the group 12, for example in a work station into which the group 12 is transferred to enable the next group 12 to be formed.

The invention claimed is:

1. A method for the production of electrical energy storage devices, said method comprising the steps of:
   feeding a first separator and a second separator;
   arranging a sequence of first electrodes one after the other between said first and second separator;
   arranging a sequence of second electrodes one after the other on a side of the first separator opposite to the second separator, the second electrodes being superimposed over respective first electrodes with the interposition of the first separator, second electrodes not being arranged on some portions of the first separator overlapped to one or more first electrodes;
   arranging a sequence of third electrodes one after the other on a side of the second separator opposite to the first separator, the third electrodes being superimposed over respective first electrodes with the interposition of the second separator, third electrodes not being arranged on some portions of the second separator superimposed to one or more first electrodes;
   the second electrodes being superimposed over first electrodes which in turn are superimposed over portions of the second separator on which third electrodes are not arranged, the third electrodes being superimposed over first electrodes which in turn are superimposed over portions of the first separator on which second electrodes are not arranged;
   said first and second separators comprising two continuous elements, said method comprising the step of separating discrete elements from a product comprising said first, second and third electrodes and said first and second separators, each discrete element comprising only one first electrode between the separators and only one other electrode that consists of a second electrode or a third electrode.

2. A method according to claim 1, comprising the step of forming at least one first group comprising a plurality of said discrete elements coupled to each other and the step of forming at least one second group comprising a plurality of said discrete elements coupled to each other; the other electrode of the discrete elements of said first group being a second electrode and/or the other electrode of the discrete elements of said second group being a third electrode.

3. A method according to claim 2, comprising the step of separating auxiliary discrete elements from a product comprising said first electrodes arranged on said first and second separator without said second and third electrodes, in which each auxiliary discrete element comprises only one first electrode between the separators, without any other electrode.

4. A method according to claim 3, wherein an auxiliary discrete element is located at one end of the first group and at one end of the second group so that the electrodes placed at the two opposite ends of each group, that is both for the first group and for the second group, consist of first electrodes.

5. A method according to claim 3, comprising the step of forming at least one first magazine of said auxiliary discrete elements.

6. A method according to claim 1, comprising the step of forming at least one second magazine of said discrete elements in which said other electrode is a second electrode and at least one third magazine of said discrete elements in which said other electrode is a third electrode.

7. A method according to claim 1, wherein said first electrodes comprise anodes and/or wherein said second electrodes comprise cathodes and/or wherein said third electrode comprise cathodes.

8. A method according to claim 1, comprising the step of coupling, by lamination, said first, second and third electrodes with said first and second separator.

9. A method for the production of electrical energy storage devices according to claim 1, comprising the steps of:
   feeding a first separator and a second separator arranged side by side along an advancement path;
   arranging a sequence of first electrodes one after the other in said advancement path between said first and second separator;
   arranging a sequence of second electrodes one after the other in said advancement path on a side of the first separator opposite to the second separator, the second electrodes being superimposed over respective first electrodes with the interposition of the first separator, second electrodes not being arranged on some portions of the first separator overlapped to one or more first electrodes;
   arranging a sequence of third electrodes one after the other in said advancement path on a side of the second separator opposite to the first separator, the third electrodes being superimposed over respective first electrodes with the interposition of the second separator, third electrodes not being arranged on some portions of the second separator superimposed to one or more first electrodes;
   the second electrodes being superimposed over first electrodes which in turn are superimposed over portions of the second separator on which third electrodes are not arranged, the third electrodes being superimposed over first electrodes which in turn are superimposed over portions of the first separator on which second electrodes are not arranged.

10. An apparatus for the production of electrical energy storage devices by implementing the method according to claim 1, said apparatus comprising:
    an arrangement for feeding a first separator and a second separator arranged side by side along an advancement path;
    an arrangement for arranging a sequence of first electrodes one after the other interposed between the first separator and the second separator along said advancement path;
    an arrangement for arranging a sequence of second electrodes one after the other on a side of the first separator opposite to the second separator along said advancement path;
    an arrangement for arranging a sequence of third electrodes one after the other on a side of the second separator opposite to the first separator along said advancement path;
    a control arrangement configured to control said apparatus so that:
    the second electrodes are overlapped to respective first electrodes with the interposition of the first separator;
    second electrodes are not arranged on some portions of the first separator, said portions of the first separator being superimposed to one or more first electrodes;

the third electrodes are superimposed over respective first electrodes with the interposition of the second separator;

third electrodes are not arranged on some portions of the second separator, said portions of the second separator being superimposed to one or more first electrodes;

the second electrodes are superimposed to first electrodes which in turn are superimposed over portions of the second separator on which the third electrodes are not arranged;

the third electrodes are superimposed to first electrodes which in turn are superimposed over portions of the first separator on which the second electrodes are not arranged.

11. The apparatus according to claim 10, wherein said control arrangement is configured so as to separate discrete elements from a product comprising the first, second and third electrodes and the first and second separators, wherein each discrete element comprises only one first electrode between the separators and only one other electrode that consists of a second electrode or a third electrode.

12. The apparatus according to claim 11, wherein said control arrangement is configured so as to form at least one first group comprising a plurality of discrete elements and at least one second group comprising a plurality of discrete elements, in which the other electrode of the discrete elements of the first group is a second electrode and/or the other electrode of the discrete elements of the second group is a third electrode.

13. The apparatus according to claim 12, wherein said control arrangement is configured so as to place an auxiliary discrete element at one end of the first group and at one end of the second group so that the electrodes at the two opposite ends of each group, that is both for the first group and the second group, consist of first electrodes.

14. The apparatus according to claim 11, wherein said control arrangement is configured so as to separate auxiliary discrete elements from a product comprising the first electrodes arranged on the first and second separators without the second and third electrodes, in which each auxiliary discrete element comprises only one first electrode between the separators without any other electrode.

15. The apparatus according to claim 10, wherein said arrangement for feeding a first and a second separator comprises at least one first feeder provided for feeding the first separator in the form of tape and at least one second feeder provided for feeding the second separator in the form of tape.

16. The apparatus according to claim 10, wherein said arrangement for arranging a sequence of first electrodes comprises at least one third feeder provided for feeding some first electrodes into an inlet area and at least one fourth feeder provided for feeding some other first electrodes in said inlet area, said third and fourth feeders being configured so as to feed the first electrodes in an alternating manner from one to the other.

17. The apparatus according to claim 10, wherein said arrangement for arranging a sequence of second electrodes comprises at least one fifth feeder provided for feeding the second electrodes on a side of the first separator.

18. The apparatus according to claim 10, wherein said arrangement for arranging a sequence of third electrodes comprises at least one sixth feeder provided for feeding the third electrodes on a side of the second separator.

19. The apparatus according to claim 10, wherein said control arrangement comprises a programmable electronic device.

* * * * *